United States Patent [19]

Rubbmark et al.

[11] Patent Number: 4,810,957
[45] Date of Patent: Mar. 7, 1989

[54] DEVICE FOR SENSING THE NUMBER OF ITEMS STORED IN A COMPARTMENT

[75] Inventors: Jan R. Rubbmark; Leif A. Unruh; Björn L. G. Bjernstad, all of Malmö; Nils E. H. Olsson, Bara; Mariusz Gerlach, Järfälla, all of Sweden

[73] Assignee: Aktiebolaget Electrolux, Sweden

[21] Appl. No.: 55,315

[22] Filed: May 29, 1987

[30] Foreign Application Priority Data

Jun. 19, 1986 [SE] Sweden ................................. 8602751

[51] Int. Cl.⁴ ............................................. G01R 27/26
[52] U.S. Cl. ..................................... 324/61 R; 340/568
[58] Field of Search ............. 340/568, 562; 324/61 R; 198/340, 349, 350

[56] References Cited

U.S. PATENT DOCUMENTS

| | | | |
|---|---|---|---|
| 4,293,852 | 10/1981 | Rogers | 340/568 |
| 4,524,968 | 6/1985 | Dölp | 340/568 |
| 4,567,410 | 1/1986 | Martin et al. | 324/61 R |

Primary Examiner—Reinhard J. Eisenzopf
Assistant Examiner—Maura K. Regan
Attorney, Agent, or Firm—Alfred E. Miller

[57] ABSTRACT

A device for sensing the number of items (14) consecutively disposed in a compartment (12), preferable bottles or cans disposed in a beverage magazine (13) in a refrigerator (10). At each item (14) at opposite sides of said item electric conducting areas (20a,b,c;21a,b,c) are provided which form a capacitor (22a,b,c). The capacitors formed in each compartment are interconnected to form a circuit ($C_k$) the capacitance of which depends on the number of items (14) in the compartment (12).

20 Claims, 2 Drawing Sheets

DEVICE FOR SENSING THE NUMBER OF ITEMS STORED IN A COMPARTMENT

Often, hotel rooms are equipped with refrigerators containing a selection of beverages to be used at the discretion of the room guest. As a rule, the beverages taken out are debited manually upon information given by the guest as to the number of beverages taken out.

There are also computer-based systems which are connected to the refrigerators in the hotel rooms. In such a system there is a demand for sensors which indicate, in some way, that a beverage has been taken out and which one has been selected.

In a known computer-based registering system for hotel refrigerators a number of compartments have been provided by lying bottles and cans. In each compartment a number of bottles or cans are arranged which contain the same kind of beverage. The compartments are blocked by gates and by contacts an indication is given each time the gate is opened and a bottle or can taken out.

A disadvantage related to the use of contacts in the way described for indicating of withdrawals is that one only gets an idea about the number of withdrawals made but not about the actual contents of the refrigerator. Therefore, this kind of indication presupposes that the computer system be regularly updated with information as to the actual contents of the refrigerators, for example when the refrigerators are being refilled.

The object of the invention is, in particular in hotel refrigerators, to simplify the registering of withdrawals made in such a way that at the same time it will be possible to get a clear picture of the actual contents of the different refrigerators.

An embodiment of the invention will now be described with reference to the enclosed drawings, in which FIG. 1 shows in perspective a hotel refrigerator, partly in section.

Figure 4:
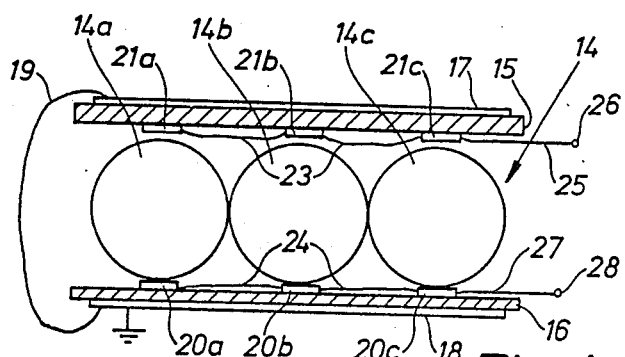

FIG. 4 schematically shows a beverage magazine with beverage packages, bottles or cans.

Figure 5:
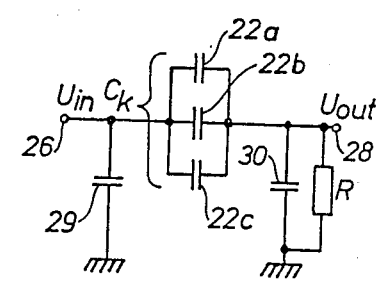

FIG. 5 is an equivalent electric circuit diagram for capacitances included in the magazine.

Figure 6:
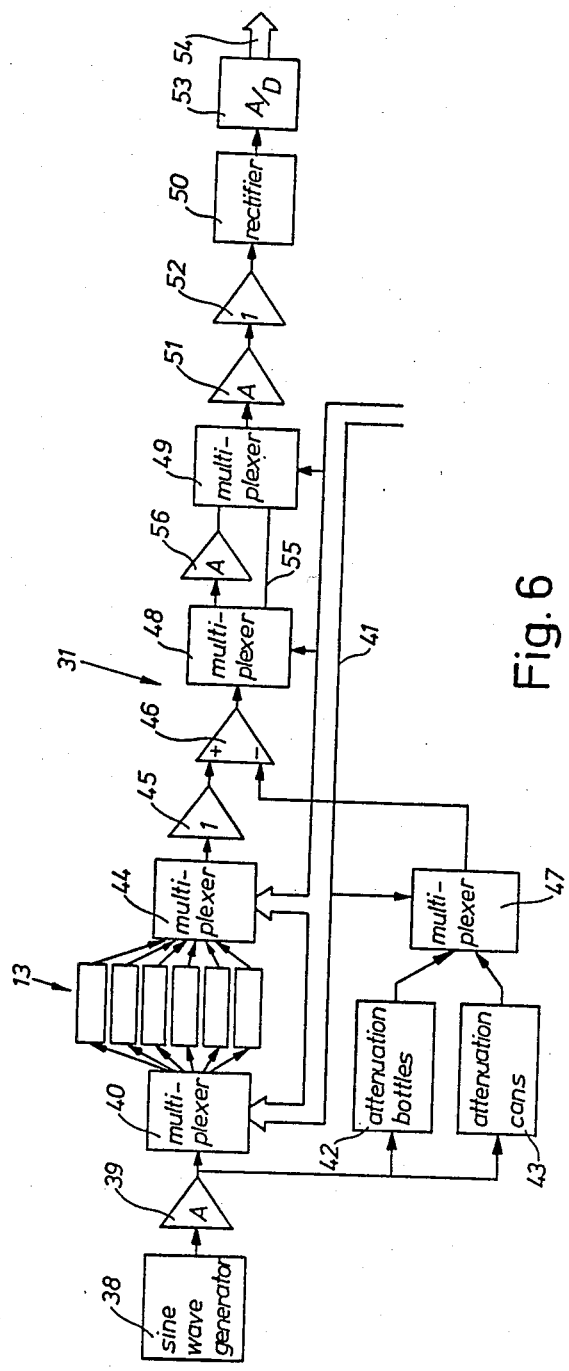

FIG. 6, finally, is a block diagram of a device according to the invention for sensing of a number of beverage magazines in a refrigerator.

Figure 1:
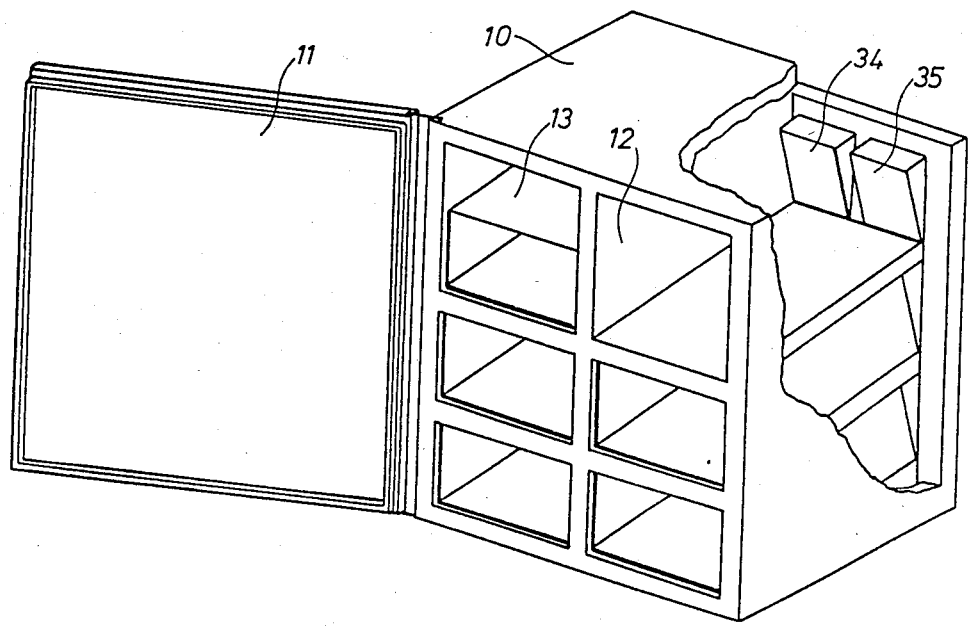

In FIG. 1 there is shown a refrigerator 10 closable by a door 11. The refrigerator is divided into compartments 12 and in each compartment a beverage magazine is detachably arranged. Each magazine contains beverage packages 14 of the same kind, cans or bottles, stored in lying position in the magazine, see FIG. 4. Suitably, a magazine contains beverages of the same sort, because the contents sensor chosen can only register the number of beverages but not the sort concerned.

The indication of each the contents of magazine is based on the principle of including the beverage packages in the dielectric of the capacitor wherein the capacitance of the capacitor depends on the number of packages in the magazine. In FIG. 4 there are schematically shown three packages 14a, b, c inserted in the magazine 13 which has a top wall 15 and a bottom wall 16. On the outside the two walls are covered with thin metal layers 17, 18 interconnected by a conductor 19. The metal layers are connected to earth potential and form a shield which electrically separates the two magazines from one another. The three packages rest on strips 20a, b, c of an electrically conductive material with an intermediate thin layer of an insulating material. The said strips cooperate with the strips 21a, b, c, disposed on the inside of the wall 15 to form three capacitors 22a, b, c, FIG. 5, which are connected in parallel. As seen in FIG. 4, the strips 20a, b, c are interconnected by conductors 23 and the strips 21a, b, c are interconnected by conductors 24. For connecting of the magazine to a measuring device the strip 21c is connected to a terminal 26 by a conductor 25. Correspondingly, the strip 20c is connected to a terminal 28 via a conductor 27. In FIG. 5 the capacitance between the terminal 26 and earth is referred to as 29 and the capacitance between the terminal 28 and earth has the reference numeral 30. Due to reasons given below, in the example shown the conducting areas have been constituted by narrow strips in each storing position. However, alternatively, the strips may be replaced by conductive areas which in the form of a metal layer, a metal plate or the like extend over all storing positions. Then, the thin layer of insulating material has the same form.

In the following a few examples will be given of practical calculations of the capacitance of the capacitors 22a, b, c which together form the capacitance $C_k$. In the magazine certain dimensional magnitudes cannot be influenced, among these the distance d between the capacitor plates and the width of the plates = the length of the can plus a certain play. The length l of the magazine depends on the number of packages and in the example the length equals to three times the diameter of the can. In case of a can $d \approx 0.072$ m, $b = 0.11$ m and $l = 0.2$ m. A calculation of the capacitance in the traditional way gives for the empty magazine the value 2.7 pF.

When a conducting cylinder (the can) is put between the plates the capacitance of the capacitor increases. The increase depends on the diameter of the cylinder and the position thereof between the plates. A symmetric positioning gives the lowest increase of the capacitance whereas the highest increase will be achieved when the can rests on one of the capacitor plates with an intermediate layer of a thin insulating tape of a thickness 0.05 mm. The increase achieved with the can position as shown equals to 4.5 pF.

A magazine for bottles has a greater width $b = 0.22$ m. The remaining dimensions are the same. The capacitance of an empty magazine is 5.329 pF (calculated value). The contents of the bottle is considered conducting which is an approximation quite acceptable. The inner diameter of the bottle is smaller than the outer diameter of the can causing a smaller increase of the capacitance. With the bottle positioned as in the can case at a distance of 0.05 mm from the bottom plate the maximum increase will be about 3.5 pF. Especially in connection with bottles the appearance of labels can distort the measurement result. This is caused by the capacitance between the plates taking different values depending on the label being turned downwards or to any other direction. In order to decrease the influence of the label the thickness of the insulating tape should be least equal the thickness of the label.

In connection with the practical calculations it has been assumed that the capacitor plates extend along the whole surface of the walls 15, 16 in FIG. 4. However, advantageously the capacitor plates can instead by provided as strips positioned on the walls 15 and 16, respectively, and only in the area of those positions in the compartment where cans or bottles are to be found. The increase of the capacitance will be the same but the capacitance of the empty magazine will be lower, in the can case 0.8 pF and for the bottle magazine 1.6 pF. In addition to the reduction of the capacitance of the empty magazine the described design of the capacitor plates results in a lower value of the capacitance 30. The advantage connected therewith will be indicated below.

According to the invention the measuring of the capacitance $C_k$ of the magazine takes place by applying a low-frequency sine voltage $U_{in}$ to the terminal 26 causing an output voltage $U_{out}$ on the terminal 28 the amplitude of which depends on the number of cans or bottles in the magazine. The output voltage is heavily attenuated by a high-pass filter formed by the capacitance $C_k$ and a resistance R. As a result even small changes in the capacitance $C_k$ will result in large changes in the impedance of this capacitance. The resistance value is chosen so that the output signal becomes as large as possible. this will be achieved if R is chosen large at the same time as the capacitance 30 is small. In order to remedy the influence of variations in the capacitance 30 due to constructional defects a higher value of this capacitance is chosen than the optimum lowest one resulting in a reduction of the output voltage. For magazine of cans the following values of the output voltage have been measured: empty magazine—0.10 volts, one can —0.27 volts, two cans—0.43 volts and three cans—0.56 volts. Corresponding values for a bottle magazine have been measured as 0.09 volts, 0.17 volts, 0.26 volts and 0.32 volts, respectively.

Figure 2:
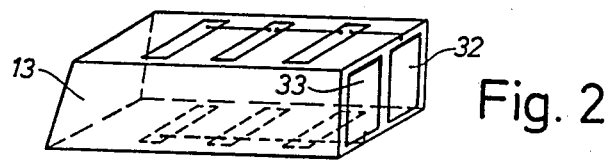
FIG. 2 illustrates a beverage magazine intended for use in the refrigerator of FIG. 1.
Figure 3:
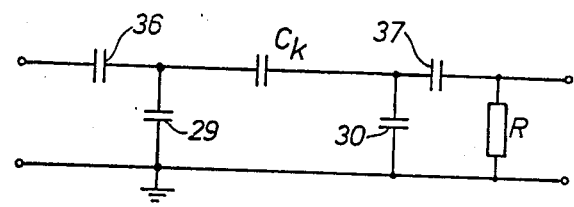
FIG. 3 is an equivalent electric circuit diagram for capacitances included in the magazine.

In FIG. 6 a block diagram is shown of a device 31 for measuring of a number of magazines 13, in the example six magazines. The measuring device generates analogue measurement values in the form of DC voltages which in case of a computer-based system are converted into digital form. However, this conversion falls outside of the scope of the invention and will not be described in detail. The measuring circuit shown in FIG. 5 can be connected to the measuring device in any known way. In the embodiment shown in FIGS. 1-3 the back of the magazine is provided with two metal plates 32, 33, which cooperate with two plates 34, 35 disposed in each compartment. The plate 32 corresponds to the terminal 26 of FIG. 4, whereas the plate 33 corresponds to the terminal 28. Via plates 34, 35 the inserted magazine is capacitively connected to the measuring device 31. In the circuit diagram of FIG. 3 the plates 32, 34; 33, 35 are represented by capacitors 36, 37. These are selected to have a large capacitance in order not to influence the measurement.

The input voltage to the measuring circuit of FIG. 5 is generated by a function generator 38 emitting a sine voltage. After amplification in an amplifier 39 the signal is transferred to one of the magazines by a multiplexer 40. The multiplexer is controlled by control signals on a data bus 41 so as to consecutively connect the six magazines to the measuring device. From the amplifier 39 the signal is also transferred to an attenuating device 42 for bottle magazines and to an attenuating device 43 for can magazines, respectively. Via a multiplexer 44 and an impedance converter 45 the signal from the connected magazine is transferred to the positive input of a differential amplifier 46. The negative input of this amplifier is connected to the outputs of the attenuating devices 42, 43 via a multiplexer 47. Via a multiplexer 48 and an additional multiplexer 49 the output of the differential amplifier is connected to a rectifier 50 via an amplifier 51 and an impedance converter 52. The rectifier is connected to an A/D-converter 53 which converts the analogue voltage values into digital form to be transferred to a computer, not shown, via a data bus 54. A conductor 55 directly interconnects the two multiplexer units 48 and 49. These units are also interconnected by an amplifier 56. Because the signals from a bottle magazine are at a lower level than those from a can magazine amplification must be used if the same measuring chain is to be used. Therefore, a bottle magazine signal is led via the amplifier 56 whereas a can magazine signal is led via the conductor 55.

The function of the two attenuating devices 42, 43 is to emit a signal to the differential amplifier which with a signal from the magazine in case of empty magazine results in 0 volts out from the amplifier thereby calibrating the same. The different multiplexer units 40, 44, 47, 48, 49 are controlled by control signals on the bus 41 to consecutively connect the six different magazines 13 to the measuring device. The control signals select the correct attenuating device 42 or 43 and control whether or not the amplifier 55 needs to be connected.

We claim:

1. In combination, a magazine for receiving a plurality of bottles or cans, and means for sensing the number of said bottles or cans in said magazine, said means for sensing comprising first and second spaced apart conductor arrangements within said magazine and mounted to have a capacitance therebetween dependent upon the number of bottles or cans in said magazine, said means for sensing comprising circuit means connected to apply a signal voltage to said first conductor arrangement whereby said signal voltage is attenuated by the capacitance between said first and second conductor arrangements, and measuring means connected to said second conductor arrangement for producing an output response to the voltage at said second conductor arrangement.

2. The combination of claim 1 wherein said conductor arrangements each comprise a planar conductor substantially coextensive with the region of said magazine adapted to receive bottles or cans.

3. The combination of claim 1 wherein said conductor arrangements each comprise a plurality of spaced conductor strips positioned in substantial alignment with portions of said magazine adapted to receive bottles or cans, and means for interconnecting the respective conductor strips.

4. The combination of claim 1 wherein said magazine is parallelopiped shaped, is of an insulating material and has first and second opposed inside walls, said first and second conductor arrangements being affixed to said first and second walls respectively.

5. The combination of claim 4 further comprising interconnected conductive layers on the outside of each of said first and second inside walls.

6. The combination of claim 1 further comprising an insulating layer on each of said first and second conductor arrangements.

7. The combination of claim 1 wherein said means for applying a signal voltage comprises means for applying a sine wave voltage to said first conductor arrangement, and said measuring means comprises rectifying means for producing a direct voltage responsive to the voltage on said second conductor means.

8. The combination of claim 7 further comprising means for converting the rectified voltage to digital form.

9. The combination of claim 7 further comprising an attenuator, means for applying said sine wave voltage to said attenuator, and means for comparing the voltage at said second conductor arrangement and the output voltage of said attenuator, and means for applying the output of said comparing means to said rectifying means, said attenuator having an impedance to result in a predetermined output from said comparing means in the absence of cans or bottles in said magazine.

10. A refrigerator comprising a first magazine for receiving a plurality of bottles or cans, said first magazine having first and second opposed inside walls, first and second conductor arrangements on said first and second walls respectively and mounted to have a capacitance therebetween dependent upon the number of bottles or cans in said magazine, and means for sensing the number of bottles or cans in said magazine comprising a circuit arrangement connected to apply a signal voltage to said first conductor arrangement whereby said signal voltage is attenuated by the capacitance between said first and second conductor arrangements, and measuring means connected to said second conductor arrangement for producing an output responsive to the voltage at said second conductor arrangement.

11. The refrigerator of claim 10 wherein said conductor arrangements each comprise a conductive plate substantially coextensive with the respective wall of said magazine, and wherein said first magazine is parallelopiped shaped and is of an insulating material, and further comprising interconnected conducting layers on the outsides of said first and second walls.

12. The refrigerator of claim 10 wherein said conductor arrangements each comprise a plurality of interconnected spaced parallel conductor strips positioned in substantial alignment with portions of said magazine adapted to receive bottles or cans, and wherein said first magazine is parallelopiped shaped and is of an insulating material, and further comprising interconnected conducting layers on the outsides of said first and second walls 13. The refrigerator of claim 10 further comprising a resistor connected to said second conductor arrangement to form a high pass filter with the capacitance between said first and second conductors.

14. The refrigerator of claim 10 further comprising an insulating layer on each of said first and second conductor arrangements.

15. The refrigerator of claim 10 wherein said circuit arrangement for applying a signal voltage comprises means for applying a sine wave voltage to said first conductor arrangement, and said measuring means comprises rectifying means for producing a direct voltage responsive to the voltage on said second conductor means.

16. The refrigerator of claim 15 further comprising first and second attenuators, means for applying said sine wave voltage to said attenuator, and means for selectively comparing the voltage at said second conductor arrangement with the output voltages of said first and second attenuators, and means for applying the output of said comparing means to said rectifying means, said attenuator having impedances to result in a predetermined output from said comparing means in the absence of cans or bottles respectively in said magazine.

17. The refrigerator of claim 10 further comprising means for converting the rectified voltage to digital form.

18. The refrigerator of claim 10 wherein said first magazine is removable mounted in said refrigerator.

19. The refrigerator of claim 10 further comprising a second magazine for receiving a plurality of bottles or cans, said second first magazine having third and fourth opposed inside walls and third and fourth conductor arrangements on said third and fourth respectively and mounted to have a capacitance therebetween dependent upon the number of bottles or cans in said magazine, said means for sensing the number of bottles or cans in said magazine comprising means for selectively connecting said circuit arrangement to apply said a signal voltage to said first conductor arrangement and said third conductor arrangement, and means for selectively connecting said second and fourth conductor arrangements to said measuring means.

20. The refrigerator of claim 19 wherein each of said first and second magazines is removably mounted in said refrigerator.

* * * * *

UNITED STATES PATENT AND TRADEMARK OFFICE
CERTIFICATE OF CORRECTION

PATENT NO. : 4,810,957

DATED : March 7, 1989

INVENTOR(S) : Jan R. Rubbmark; Leif A. Unruh, Bjorn L. G. Bjernstad; Nils E. H. Olsson; Mariusz Gerlach It is certified that error appears in the above-identified patent and that said Letters Patent is hereby corrected as shown below:

Column 2, line 64, delete "be" and insert --at--;

Column 3, line 1, delete "by" and insert --be--;

Column 4, line 40, delete "response" and insert --responsive--.

Signed and Sealed this

Seventh Day of November, 1989

Attest:

JEFFREY M. SAMUELS

*Attesting Officer*  *Acting Commissioner of Patents and Trademarks*